May 1, 1934.  M. CHARLES  1,956,669
SHOCK ABSORBER
Filed April 8, 1933
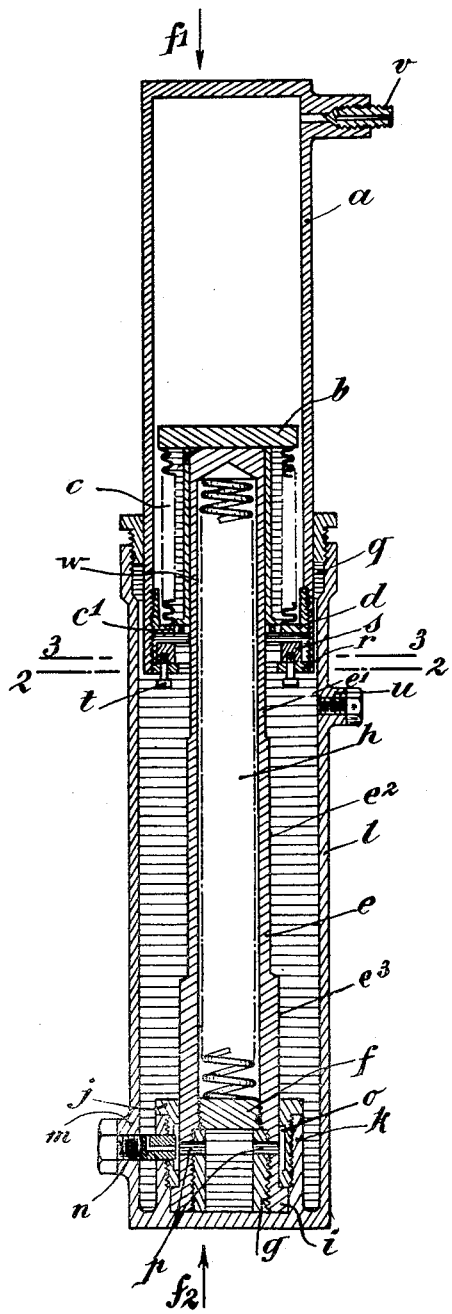
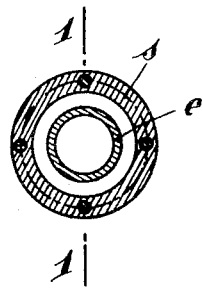
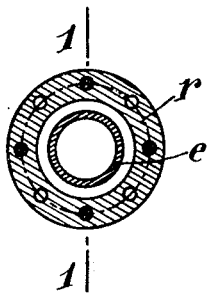
Inventor:
Maurice Charles
By Mauro + Lewis
Attorneys Patented May 1, 1934

1,956,669

UNITED STATES PATENT OFFICE 1,956,669

SHOCK ABSORBER

Maurice Charles, Courbevoie, France

Application April 8, 1933, Serial No. 665,211
In France April 20, 1932

8 Claims. (Cl. 267—34)

The object of the present invention is to provide a hydro-pneumatique shock absorber acting both as a suspension device and as a shock absorbing device braking the displacements in the suspended part.

In the hydro-pneumatic shock absorber according to my invention, suspension is obtained through a piston, bellows, or membrane, resting on compressed air at a suitable pressure. The displacements of the suspended part in one direction, after a shock, are obtained by causing a fluid to flow past an annular orifice of variable section, the outer diameter of said annular orifice being constant, and the inner diameter being variable with the displacements of the suspended part. The displacements of the suspended part in the other direction are braked by causing the same fluid to flow through a calibrated orifice, the flow of fluid in either direction being controlled by a valve cooperating with a perforated seat.

A preferred embodiment of my invention will be hereinafter described with reference to the accompanying drawing given merely by way of example, and in which:

Fig. 1 is a longitudinal sectional view of the apparatus according to my invention on the line 1—1 of Figs. 2 and 3. (In this figure the horizontal cross hatching represents the liquid contained in the shock absorber);

Fig. 2 is a cross sectional view on the line 2—2 of Fig. 1;

Fig. 3 is a cross section view on the line 3—3 of Fig. 1.

In a tube $a$, acting as an air cylinder, there is fitted a piston $b$ forming, in combination with said cylinder $a$, a fluidtight chamber of variable volume. In order to obtain fluidtightness, in the example shown, said piston is connected through bellows $c$ to an end piece $d$ fixed in a fluidtight manner to tube $a$. The rod $e$ of said piston is hollow and bored in such manner that a second piston $f$ fits accurately therein in a slidable manner. Said piston $f$ is applied against the end $g$ of rod $e$ by a spring $h$. The outer surface of rod $e$ is provided with stepped parts extending from one end to the other. In the embodiment shown in Fig. 1, there are three stepped parts $e^1$, $e^2$, $e^3$.

The lower end of rod $e$ is provided with a flange $i$ strongly applied by a nut $j$ against the lower end $k$ of a second tube $l$ adapted to slide on the outside of tube $a$. Tube $l$ is provided at $m$ with an inwardly threaded boss in which can be screwed a piece $n$ provided with a calibrated conduit connecting the inside of tube $l$ with the underside of piston $f$ through a calibrated hole opening into a groove $o$ of nut $j$ opposite which a series of large holes $p$ are provided in rod $e$. Fluidtightness between cylinders $a$ and $l$ is ensured through a stuffing box $q$. On the other hand, cylinder $a$ extends a certain distance below the end of cylinder $d$ and is closed by plug $r$ provided with eight holes. Between said plug and the cylinder end, a valve $s$ is guided in plug $r$ by four screws $t$ provided in four of the holes of said plug, the four other holes being kept free for the flow of oil. Said oil is introduced into cylinder $l$ through a plug $u$, and air is introduced into cylinder $a$ through a valve $v$. Finally, a supporting member $w$ prevents bellows $c$ from being flattened or tubes $a$ and $l$ from being driven out from one another by the air pressure.

The operation of the apparatus above described takes place as follows:

Assuming that the apparatus is in the position of Fig. 1 (expanded position) filled with compressed air at a suitable pressure and filled with liquid, if a rapidly increasing load is applied between the ends of the shock absorber as indicated by arrows $f^1$ and $f^2$, said load will cause tubes $a$ and $l$ to slide in a telescopic manner within each other, thus stretching bellows $c$ and compressing more and more the air contained in tube $a$.

Furthermore, the liquid contained in tube $l$ is compelled to flow into bellows $c$, which it can do without resistance, by lifting valve $s$ and passing through holes $c^1$. But, as the cross section of the space within bellows $c$ is smaller than the cross section of the space within tube $l$, the liquid is subjected to a pressure that is the stronger as the shock is more sudden. Said liquid will therefore flow through the calibrated conduit of piece $n$ into rod $e$ thus lifting piston $f$ and compressing spring $h$. This will produce a braking and a compression of the shock absorber, said braking being proportional with the strength of the shock, and being adjustable merely by substituting to piece $n$ another similar piece having a calibrated conduit of different cross section, and this without taking the apparatus to pieces.

When the load is no longer exerted on the apparatus, the compressed air, tending to expand itself, pushes back the liquid present inside the bellows. But valve $s$ driven by said liquid is applied against its seat, and the liquid is now allowed to pass only through the annular orifice existing between plug $r$ and rod $e$. Said orifice, which is very small at the beginning, when the shock absorber is at the end of its compression stroke (due to the fact that the outer diameter of portion $e^3$ is but slightly smaller than the inner diameter of annular plug $r$) increase by steps during the expansion stroke. In that way, bouncing being avoided by a strong braking action at the beginning, the shock absorber comes rapidly back into its position of rest in which it is ready to receive a new shock.

During that time, spring $h$ has pushed piston $f$ thus restoring to cylinder $l$ the liquid that was contained in rod $e$.

The braking action during the expansion stroke could eventually by arranged to take place differently by accordingly choosing the shape of rod $e$.

While I have described what I deem to be a practical and efficient embodiment of my invention, it should be well understood that I do not wish to be limited thereto, as there might be changes made in the arrangement, disposition and form of the parts without departing from the principle of my invention as comprehended within the scope of the appended claims.

What I claim is:

1. A shock absorbing device of the type described comprising in combination, a cylinder filled with a liquid and closed at one end, a second cylinder of smaller inner cross section adapted to slide in the first mentioned one and closed at the opposite end, a piston adapted to slide in said second cylinder, air under pressure being interposed between the closed end of the second cylinder and said piston, a hollow rod for said piston rigidly fixed to the closed end of the first cylinder, a second piston adapted to slide in said hollow rod, a calibrated conduit for connecting the inside of said hollow rod with the inside of the first cylinder so that liquid forced from said first cylinder into said hollow rod may move the last mentioned piston in said rod, and elastic means for opposing the displacements of the last mentioned piston under the action of said incoming liquid.

2. A shock absorbing device of the type described comprising in combination, a cylinder filled with a liquid and closed at one end, a second cylinder of smaller inner cross section adapted to slide in the first mentioned one and closed at the opposite end, a piston adapted to slide in said second cylinder, air under pressure being interposed between the closed end of the second cylinder and said piston, a hollow rod for said piston rigidly fixed to the closed end of the first cylinder, a second piston adapted to slide in said hollow rod, a calibrated conduit for connecting the inside of said hollow rod with the inside of the first cylinder so that liquid forced from said first cylinder into said hollow rod may move the last mentioned piston in said rod, elastic means for opposing the displacements of the last mentioned piston under the action of said incoming liquid, and means for braking the outward stroke of the two pistons one with respect to each other after their having been forced into each other.

3. A shock absorbing device of the type described comprising in combination, a cylinder filled with a liquid and closed at one end, a second cylinder of smaller inner cross section adapted to slide in the first mentioned one and closed at the opposite end, a piston adapted to slide in said second cylinder, air under pressure being interposed between the closed end of the second cylinder and said piston, a hollow rod for said piston rigidly fixed to the closed end of the first cylinder, a second piston adapted to slide in said hollow rod, a calibrated conduit for connecting the inside of said hollow rod with the inside of the first cylinder so that liquid forced from said first cylinder into said hollow rod may move the last mentioned piston in said rod, elastic means for opposing the displacement of the last mentioned piston under the action of said incoming liquid, a partition carried by the open end of the second cylinder leaving an annular space between itself and said piston rod, said partition being provided with at least one hole, and valve means for allowing fluid to flow free from the first cylinder into the second one through said hole and preventing liquid from flowing from the second cylinder into the first cylinder through said holes.

4. A shock absorbing device according to claim 3 in which the outer surface of the piston rod has a stepped outline so that the outer diameter of said rod is smaller near the piston than near the closed end of the first cylinder where it is but slightly smaller than the inner diameter of said partition.

5. A device according to claim 1 in which the piston comprises a piston head and an annular bellows fixed in a fluidtight manner at one end to said piston head and at the other end to the open end of the second cylinder.

6. A device according to claim 3 in which the piston comprises a piston head and an annular bellows fixed in a fluidtight manner at one end to said piston head and at the other end to the open end of the second cylinder.

7. A device according to claim 1 in which said calibrated conduit is provided in a piece removably fixed to said second cylinder and to said hollow rod.

8. A device according to claim 3 in which said calibrated conduit is provided in a piece removably fixed to said second cylinder and to said hollow rod.

MAURICE CHARLES.